United States Patent
Hermansen et al.

(10) Patent No.: US 6,963,871 B1
(45) Date of Patent: Nov. 8, 2005

(54) SYSTEM AND METHOD FOR ADAPTIVE MULTI-CULTURAL SEARCHING AND MATCHING OF PERSONAL NAMES

(75) Inventors: John Christian Hermansen, Catharpin, VA (US); Leonard Arthur Shaefer, Jr., Ashburn, VA (US); Heather McCallum-Bayliss, McLean, VA (US); Richard D. Lutz, Silver Spring, MD (US)

(73) Assignee: Language Analysis Systems, Inc., Herndon, VA (US)

( * ) Notice: Subject to any disclaimer, the term of this patent is extended or adjusted under 35 U.S.C. 154(b) by 0 days.

(21) Appl. No.: 09/275,766

(22) Filed: Mar. 25, 1999

Related U.S. Application Data
(60) Provisional application No. 60/079,233, filed on Mar. 25, 1998.

(51) Int. Cl.[7] .............................................. G06F 17/30
(52) U.S. Cl. ............................ 707/6; 707/3; 707/101; 707/104.1; 704/1
(58) Field of Search .................. 707/1–10, 100–104.1, 707/532, 536; 704/1–10, 258

(56) References Cited

U.S. PATENT DOCUMENTS

| | | | |
|---|---|---|---|
| 5,040,218 A | * 8/1991 | Vitale et al. ................ 381/52 |
| 5,062,143 A | 10/1991 | Schmitt ..................... 382/36 |
| 5,212,730 A | * 5/1993 | Wheatley et al. ............ 381/43 |
| 5,323,316 A | 6/1994 | Kadashevich et al. . 364/419.01 |
| 5,337,232 A | 8/1994 | Sakai et al. ............ 364/419.08 |
| 5,369,726 A | 11/1994 | Kroeker et al. ............ 395/2.45 |
| 5,369,727 A | 11/1994 | Nomura et al. ............ 395/2.61 |
| 5,371,676 A | 12/1994 | Heemels et al. ........ 364/419.11 |
| 5,375,176 A | 12/1994 | Spitz ......................... 382/39 |
| 5,377,280 A | 12/1994 | Nakayama ................ 382/17 |
| D359,480 S | 6/1995 | Levine ..................... D14/115 |
| 5,425,110 A | 6/1995 | Spitz ........................ 382/192 |
| 5,432,948 A | 7/1995 | Davis et al. ................ 395/800 |
| 5,434,777 A | 7/1995 | Luciw ..................... 364/419.13 |
| 5,440,663 A | 8/1995 | Moese et al. ............... 395/264 |
| 5,457,770 A | 10/1995 | Miyazawa ................ 395/2.64 |
| 5,485,373 A | 1/1996 | Davis et al. ........... 364/419.13 |
| 5,490,061 A | 2/1996 | Tolin et al. ............ 364/419.02 |
| 5,515,475 A | 5/1996 | Gupta et al. ............... 395/2.51 |
| 5,526,463 A | 6/1996 | Gillick et al. ................ 395/2.6 |
| 5,548,507 A | 8/1996 | Martino et al. ........ 364/419.01 |

(Continued)

OTHER PUBLICATIONS

Oshika et al. ("Improved Retrieval Of Foreign Names From Large Database", 1998, IEEE, pp. 480–487).*

(Continued)

*Primary Examiner*—Jean M. Corrielus
*Assistant Examiner*—Joon Hwan Hwang
(74) *Attorney, Agent, or Firm*—Fish & Richardson P.C.

(57) ABSTRACT

An automated name searching system incorporates an automatic name classifier and a multi-path architecture in which different algorithms are applied based on cultural identity of the query name. The name classifier operates with a preemptive list, analysis of morphological elements, length, and linguistic rules. A name regularizer produces a character based computational representation of the name. A pronunciation equivalent representation such as an IPA language representation, and language specific rules to generate name searching keys, are used in a first pass to eliminate database entries which are obviously not matches for the query name. The methods can also be implemented as a callable set of library routines including an intelligent preprocessor and a name evaluator that produces a score comparing a query name and database name, based on a variety of user-adjustable parameters. The user-controlled parameters permit tuning of the search methodologies for specific custom applications.

43 Claims, 9 Drawing Sheets

U.S. PATENT DOCUMENTS

| | | |
|---|---|---|
| 5,724,481 A | 3/1998 | Garberg et al. ............ 395/2.52 |
| 5,758,314 A | 5/1998 | McKenna ...................... 704/8 |
| 5,819,265 A | 10/1998 | Ravin et al. |
| 5,963,940 A | 10/1999 | Liddy et al. |
| 6,311,152 B1 | 10/2001 | Bai et al. |

OTHER PUBLICATIONS

French et al. (Applications of approximate word matching in information retrieval, ACM, 1997, pp. 9–15).*

Zobel et al. (Phonetic string matching: lessons from information retrieval, ACM, 1996, pp. 166–172).*

Marx et al. (Putting people first: specifying proper names in speech interfaces, ACM, 1994, pp. 29–37).*

Oshika et al. (improved retrieval of foreign names from large databases, IEEE, Feb. 1–5, 1988, pp. 480–487).*

Hermansen, John Christian, "*Automatic Name Searching in Large Data Bases of International Names,*" a Doctoral Dissertation, Georgetown University, University Microfilms International, 1985.

Valencia, Yvon, et al., "Identification de l'Origine Linguistique: le Cas des Noms Propres", *Journees Scientifiques et Techniques du Reseau Francil (JST'97)*, Avignon, Apr. 1997 (with English–language translation).

Roochnik, Paul, "Computer–Based Solutions to Certain Linquistic Problems Arising from the Romanization of Arabic Names," Doctoral Dissertation, Georgetown University, Washington, D.C., Feb. 19, 1993, pp. i–358.

* cited by examiner

LIA Data Stores

| High Frequency | | | |
|---|---|---|---|
| H | S | Garcia | 3 |
| H | S | Salazar | 2 |
| H | S | Sambrano | 1 |
| A | B | Mahmoud | 4 |
| A | B | Jaffar | 2 |
| O | S | Silvestri | 1 |

| N-Grams | | | |
|---|---|---|---|
| H | S | S | ndez | 3 |
| H | S | G | far | 1 |
| H | S | P | bous | 1 |
| A | B | S | fiq | 2 |
| O | S | E | agio | 1 |
| O | S | I | ahmo | 5 |

| Morphology | | | |
|---|---|---|---|
| A | B | S | addin | 3 |
| A | B | S | edin | 3 |
| A | B | S | uddin | 3 |
| O | S | P | etto | 1 |
| O | S | S | etti | 2 |
| O | S | S | ini | 1 |

| TAQ | | | |
|---|---|---|---|
| H | S | de | 1 |
| H | S | la | 1 |
| H | S | las | 1 |
| A | B | bin | 3 |
| O | B | el | 1 |
| O | B | lo | 1 |

Digraph Distribution Processor Data Stores

| Digraphs | | |
|---|---|---|
| A | ez | −1.0422 |
| A | nt | 22.8733 |
| A | bd | 38.7221 |
| H | bd | 1.0572 |
| H | ez | 42.5947 |
| H | ri | 16.1242 |

| Trigraphs | | |
|---|---|---|
| A | ez# | −10.0422 |
| A | #nt | −48.1743 |
| A | bd# | 48.4551 |
| H | bd# | −32.1742 |
| H | ez# | 47.5327 |
| H | #ri | 11.1242 |

| Digraph Processor Parameters | |
|---|---|
| A | 44.2331 |
| H | −32.8765 |

| LID Parameters | | | |
|---|---|---|---|
| HFNAME | S | 10 | 8 |
| HFNAME | G | 8 | 6 |
| TAQ | S | 5 | 3 |
| TAQ | G | 4 | 2 |
| MORPHOLOGY | S | 5 | 3 |
| MORPHOLOGY | G | 4 | 2 |
| NGRAM | S | 4 | 3 |
| NGRAM | G | 3 | 2 |

| Threshold Parameters | | | | |
|---|---|---|---|---|
| A | 50 | 1.4532 | 10 | 8 |
| H | 73 | 20.5000 | 5 | 6 |
| O | 38 | (null) | 100 | 3 |

SYSTEM AND METHOD FOR ADAPTIVE MULTI-CULTURAL SEARCHING AND MATCHING OF PERSONAL NAMES

This application claims the benefit of U.S. Provisional Patent Application Ser. No. 60/079,233, filed Mar. 25, 1998, the entire disclosure of which is incorporated herein by reference.

A portion of this disclosure contains material in which copyright is claimed by the applicant and/or others. The copyright owner has no objection to the copying of this material in the course of making copies of the application file or any patents that may issue on the application, but all other rights whatsoever in the copyrighted material are reserved.

FIELD OF THE INVENTION

The present invention relates generally to automatic data processing systems that search and retrieve records from a database based on matching of personal names, and to improved systems and methods for intelligently processing name comparisons.

BACKGROUND OF THE INVENTION

Information about individuals is often stored in a computer. Access to that information is most readily gained by using the name of the individual involved. The nature of names, however, their behavior and permutations, pose significant challenges to information retrieval. Names vary during one's life (e.g., through marriage or professional preparation); they take on different forms, depending on the formality of the situation (WILLIAM CARVER/BILLY CARVER); they may be spelled differently if recorded by someone other than the individual (PRICE/PRIES). To amplify the difficulties even more, naming conventions vary across cultures. It may not be appropriate to assume that the typical American name structure of single given name (first name), single middle name or initial followed by a surname (last name) applies in a database that contains names from all over the world, a situation that is usual in today's world of global technology and communication. Names from other cultures may have compound surnames or may be composed of only one name. Names written in writing systems other than Roman may be transcribed in a variety ways into the Roman alphabet because there is no single way to represent sounds that occur in another language but do not occur in English, causing significant differences in the spelling (KIM/GHIM).

Adequate information retrieval that is based on the name must anticipate the range and kinds of variation that can occur in names, both generally and in specific cultures. Other name search or information retrieval systems are generally unable to recognize or address the full range of variation in names. Some systems assume that names are static and search only for an exact match on the name. These systems cannot accommodate even the slightest spelling variations, initials or abbreviations (JOS. Z. BROWN/ JOSEPH ZACHARY BROWNE). Other systems may use techniques or keys (such as Soundex or Soundex-like keys) that permit some minor spelling differences between names (DORSHER/DOERSHER) but these techniques generally fail to cope with significant variation (DOERSHER/ DOESHER) or problems posed by names from non-Anglo cultures (ABDEL RAHMAN/ABDURRAMN). If cultural differences are recognized, it is typically through use of equivalency lists or tables. Some of the more common variants can be accommodated in this way, but retrieval is then limited to those items on the list and cannot accommodate new representations or random variation or keying errors (GOMEZ/BOMEZ).

For a system to reach a level of adequacy for automatic name searching, it must therefore address a diverse set of issues related to name variation. Although spelling variations can often be addressed through character-matching techniques (e.g., SMITH/SMYTH), false-positive matches can result from traditional string or character comparisons when common morphological endings, such as OVICH, occur at the end of otherwise dissimilar names (e.g., ZELENOVICH/JOVANOVICH). Transcription from foreign writing systems to the Roman writing system poses additional spelling concerns. Different character sets, dialectal variations and sounds that are not represented in Roman alphabetic form at all contribute to the possibility of multiple, and often inconsistent, representations of the same name. A single Chinese character (ideogram) can be transcribed to produce numerous roman forms that have little or no resemblance to one another due to dialectal variations. For example, the character CHANG, JANG and ZHANG are different roman representations of the exact same Chinese name, as are the names WU, MHO and ENG. Similarly, a single Arabic name can result in transcriptions as diverse as KHADHAFI, CODOFFI, QATHAFI.

Character-based systems may also be confronted with significant retrieval problems caused by names with the same pronunciation but with divergent spellings. WOOSTER, WORCHESTER, and WUSTER may all share at least one identical pronunciation and yet show very different spellings. When name data are shared orally, the speaker's pronunciation, the listener's hearing (or mishearing) of the name and the speaker's expectations about the spelling of the name will impact the final written representation of a name. For example, a telephone reservationist may record a caller's name with a variety of phonetically correct spellings, which may not correspond (and may therefore not be matched to) an existing database record for that caller.

Another common cause of name variation, which creates retrieval difficulty for name search systems, is the inclusion or exclusion of name data. Depending on the data source, names may be formal such as THOMAS EDWARD WINTHROP III, or informal such as TOM WINTHROP. An ideal name search system would be capable of correlating these two names, even though only a portion of the full name is available. To predict the relationship among variant formats of names, the system must also be able to recognize what rules govern which elements can be deleted or included or changed in different cultures. MARIA DEL CARMEN BUSTOS SAENZ will become MARLA DEL CARMEN BUSTOS DE LOPEZ, if she marries JUAN ANTONIO LOPEZ GARCIA. Predicting the relationship between these names is fundamental to retrieval success.

In many name search applications, it is important to identify variant forms of a name that are considered legitimate and to link and preserve the variations; in others, it may be appropriate to establish one form of a name and to treat all other forms as errors. Even if the data base is cleaned by linking variant forms and eliminating identifiable errors, users may search for names under yet more variations.

U.S. Pat. No. 5,040,218 to Vitale et al. discloses a voice synthesis system which attempts to identify the origin of a name to enhance pronunciation. The system first searches a dictionary for a name, and if the name is not found, uses grapheme and n-gram analysis to identify the name's likely origin. Similarly, U.S. Pat. 5,062,143 to Schmitt shows a system that identifies name origin using n-gram analysis.

U.S. Pat. 5,724,481 to Garberg et al. shows a method of matching proper names in a database using a phonemic representation.

U.S. Pat. 5,758,314 to McKenna shows an international database processing system. However, this system uses Soundex algorithms to process Unicode input for all cases, rather than providing a name searching system with culture-specific algorithms.

Design Pat. D359,480 shows an IPA-based computer keyboard, but does not disclose any use of IPA for identifying data records.

The article "Identifying Source Languages: the Case of Proper Names" by Valencia and Yvon (1997) discloses statistical models for name searching based on n-gram comparisons. The article also discloses determination of the source language and the use of different statistical models for comparisons, based on the source language.

John Hermansen, a named inventor, authored a doctoral dissertation, "Automatic Name Searching in Large Data Bases of International Names" (1985) which explores the concept of cultural differences in names. The document suggests searching using different culturally specific algorithms, but discloses only a simple n-gram based algorithm.

U.S. Pat. No. 5,485,373 to Davis et al. discloses a text searching system which relies on a Unicode representation (not a phonetic alphabet). The Davis system may vary algorithms based on the language being searched, but has no name classifier. This system is not designed to search for proper names; comparisons are performed based on a Unicode representation, which is not a phonetic alphabet.

Other patents relating generally to computerized language analysis and processing include: U.S. Pat. 5,323,316 to Kadashevich et al.; U.S. Pat. No. 5,337,232 to Sakai et al.; U.S. Pat. No. 5,369,726 to Kroeker et al.; U.S. Pat. No. 5,369,727 to Nomura et al.; U.S. Pat. No. 5,371,676 to Heemels et al.; U.S. Pat. Nos. 5,375,176 and 5,425,110 to Spitz; U.S. Pat. No. 5,377,280 to Nakayama; U.S. Pat. No. 5,432,948 to Davis et al.; U.S. Pat. No. 5,434,777 to Luciw; U.S. Pat. No. 5,440,663 to Moese et al.; U.S. Pat. No. 5,457,770 to Miyazawa; U.S. Pat. No. 5,490,061 to Tolin et al.; U.S. Pat. No. 5,515,475 to Gupta et al.; U.S. Pat. No. 5,526,463 to Gillick et al.; and U.S. Pat. No. 5,548,507 to Martino et al.

None of these earlier systems provide a satisfactory system and method for multicultural name searching. Thus, the inventors believe there is a need for an improved system and method for searching name-based records and for determining the degree of similarity between two name representations.

SUMMARY OF THE INVENTION

Therefore, it is a general object of the present invention to provide a name searching system architecture with multiple processing options, which automatically selects and uses an appropriate cultural-specific set of algorithms to search for database names and evaluate their proximity to a query name.

Another broad object of the invention is to provide a system and method implementing multi-algorithm name searching strategies, where search processing differs based on one or more of: culture, ethnicity, distribution, and language.

Another more specific object of the invention is to provide an improved system and method for conducting searches using a combination of n-gram distribution and positional properties to identify matches.

A further object of the invention is to provide an improved cultural name classifier which leads to application of an appropriate set of namne-regularizing linguistic rules that generate a standardized name based on stored cultural intelligence.

Yet another object of the invention is to provide an improved name classifier, incorporating a multi-step process, including preemptive lists, linguistic rules, n-gram analysis, and additional algorithms.

A further object of the invention is to provide an improved name searching system, incorporating segment-level pre-processing. Segmentation rules and syllabic stress rules contribute to a determination of where "white space" should appear in the name. Algorithms determine which graphemes are mapped to which phonemes (based on phonological, historical, and morphological principles).

Another significant object of the invention is to provide a name searching system and method incorporating an innovative key-searching system based on the International Phonetic Alphabet (IPA). This technique converts the query name to a plurality of IPA representations, which are then used to select matching keys in a first pass through the database.

A further object of the invention is to provide a name searching system and method that selectively uses sets of generic and language-specific spelling rules to infer possible phonological manifestations for personal names. A unique aspect of the comparison algorithm derives a scored match based on atomic phonological features.

Additional objects and advantages of the invention will be apparent upon review of the specification, including its drawings and appendices.

The present invention provides an improved automatic data processing system for searching names and an improved process for effectively searching and retrieving personal names in a database. It also provides a mechanism for a user to determine the distance between two names, i.e., how closely two personal names match.

In one aspect of the invention, "fuzzy logic" name searching and matching technology is provided to locate a target database record despite a lack of absolute identity between a query name and a record name.

In one preferred embodiment, a complete automated name searching system is provided, incorporating various advantageous features of the present invention. The automated search system incorporates an automatic name classifier, a multi-path architecture in which different algorithms are applied based on cultural identity of the name, name variant generation, query regularization and expansion, compensation for transpositions, affixes, and inversions, and sorting and filtering of output. The name classifier incorporates a preemptive list, analysis of morphological elements, length, and linguistic rules. The name regularizer produces a computer recognized form (character based computational representation) rather than a human recognizable form of the name. The software design uses a pronunciation equivalent (e.g. IPA) representation and language specific rules to generate name searching keys, which are used in a first pass to eliminate database entries which are obviously not matches for the name of interest.

In another preferred embodiment, the inventive search methodologies are implemented as Application Program Interfaces (APIs) that can be integrated into an existing program application or can be used to provide the foundation for a new program application that requires name matching capabilities. In API form, the features of the present invention may be selectively used in various combinations depending on the requirements of the particular application. A callable set of library routines include an intelligent preprocessor and a name evaluator that produces a score comparing a query name and database name, based on a variety of user-adjustable parameters. The user-controlled parameters permit tuning of the search methodologies for specific custom applications, so as to achieve desired levels of precision and recall for name searching in widely varying operational settings.

BRIEF DESCRIPTION OF THE DRAWINGS

FIGS. 1 and 1*l* ( hereinafter collectively referred to as "FIG. 1") are a block diagram of the structure of an improved name searching and comparison system according to the present invention;

DETAILED DESCRIPTION OF THE PREFERRED EMBODIMENTS

Figure 1:
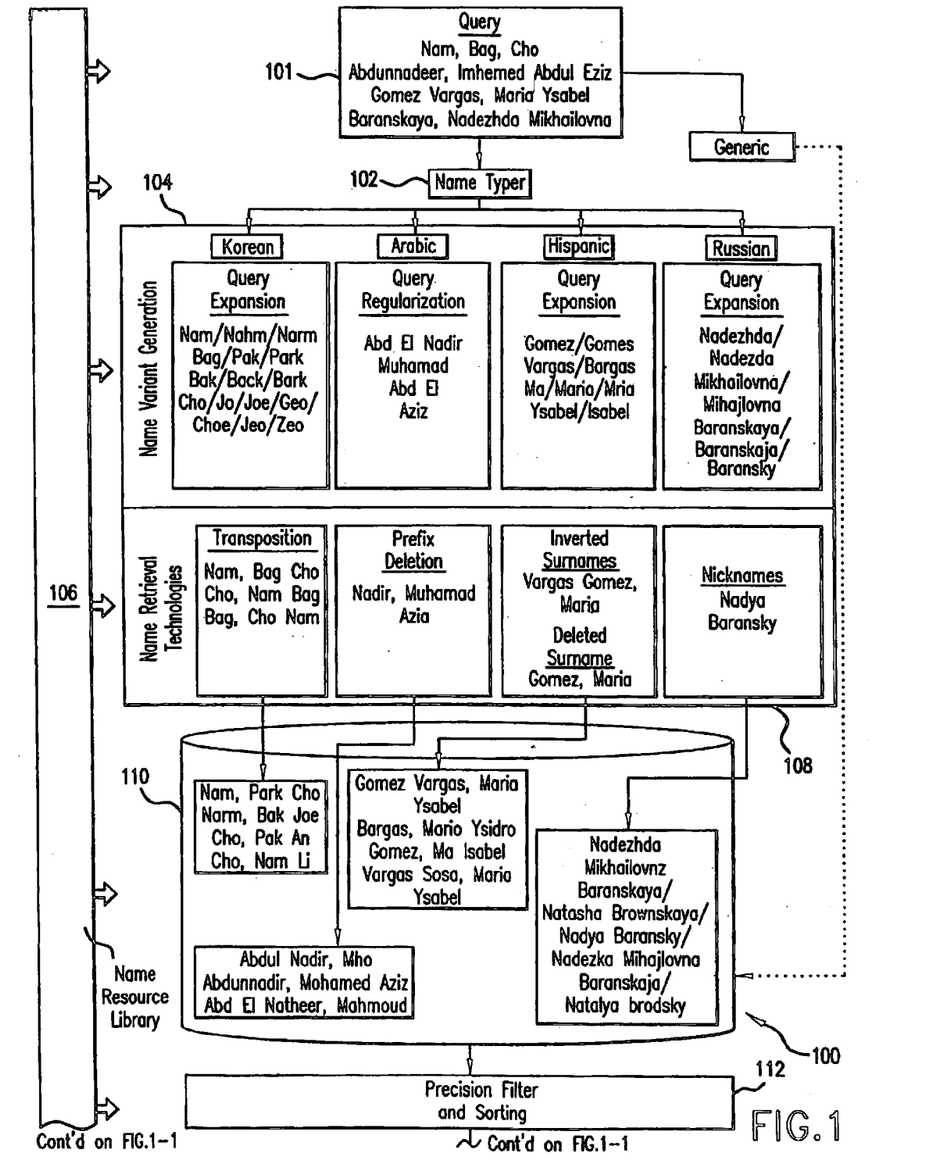

FIG. 1 shows a multi-algorithmic name search system 100 according to a first preferred embodiment of the present invention, in block schematic form. In this embodiment, system 100 sequentially performs three basic processes. First, system 100 selects a search strategy based on the cultural origin, distribution, language or ethnicity of the name in question and pre-processes the name to break it into its component parts for processing. Second, a subset of the available database records is selected, based on a culture-relevant key-indexing strategy. The objective of this subsetting process is to select a set of keys that are likely matches for the name in question. Finally, the records selected in the second process are subjected to a similarity measurement, using a complex algorithm tailored according to the selected search strategy, to evaluate and rank-order potential matches. Thus, system 100 adopts a search strategy that is specific to the ethnicity or cultural origin of the name to be matched and implements that strategy by performing a two-pass search with algorithms particularly adapted for searching those names.

Referring now to FIG. 1, system 100 comprises name classifier module 102, variant generation module 104, name reference library 106, name retrieval technology processing module 108, retrieval module 110, and precision filter and sorting module 112. System 100 has an input query 101 and an output 114.

Processing of a query begins with evaluation of the searched name by name classifier module 102. Name classifier module 102 evaluates spelling, word segmentation, titles, prefixes and suffixes, and other identifiable features of the name to determine whether it falls into one of a predetermined set of identified cultural origins, including, for example, Chinese, Arabic, Hispanic, or Russian. Anglo names and names which do not fall into one of the predetermined set of special-case cultures are classified as "other" and processed according to a generic cultural algorithm.

Appropriate pre-processing is also performed to segment the name appropriately (standardize the handling of spacing between name segments and the order of the segments) and identify apparent surnames, given names, honorifics, etc., that are part in of the input name. The operation of the name classifier in this regard is unique and inventive. To determine the type of name, name classifier module 102 may use one or more of the following, depending on the observed characteristics of the name in question: a list of names which occur with high frequency in various cultures (used to preemptively type common names without extensive algorithmic processing), culturespecific linguistic rules in the form of a Titles, Affixes, and Qualifiers (TAQ) lookup table, n-gram based name typing, and name length. N-gram name typing according to the present invention may be performed as a digraph, trigraph or other n-gram analysis where both positional and distributional properties of the n-grams (e.g., digraphs and trigraphs) are used in the algorithm for making the type determination. Name classifier module 102 preferably operates according to the software design description in Appendix A, which forms a part of this specification.

Figure 3:
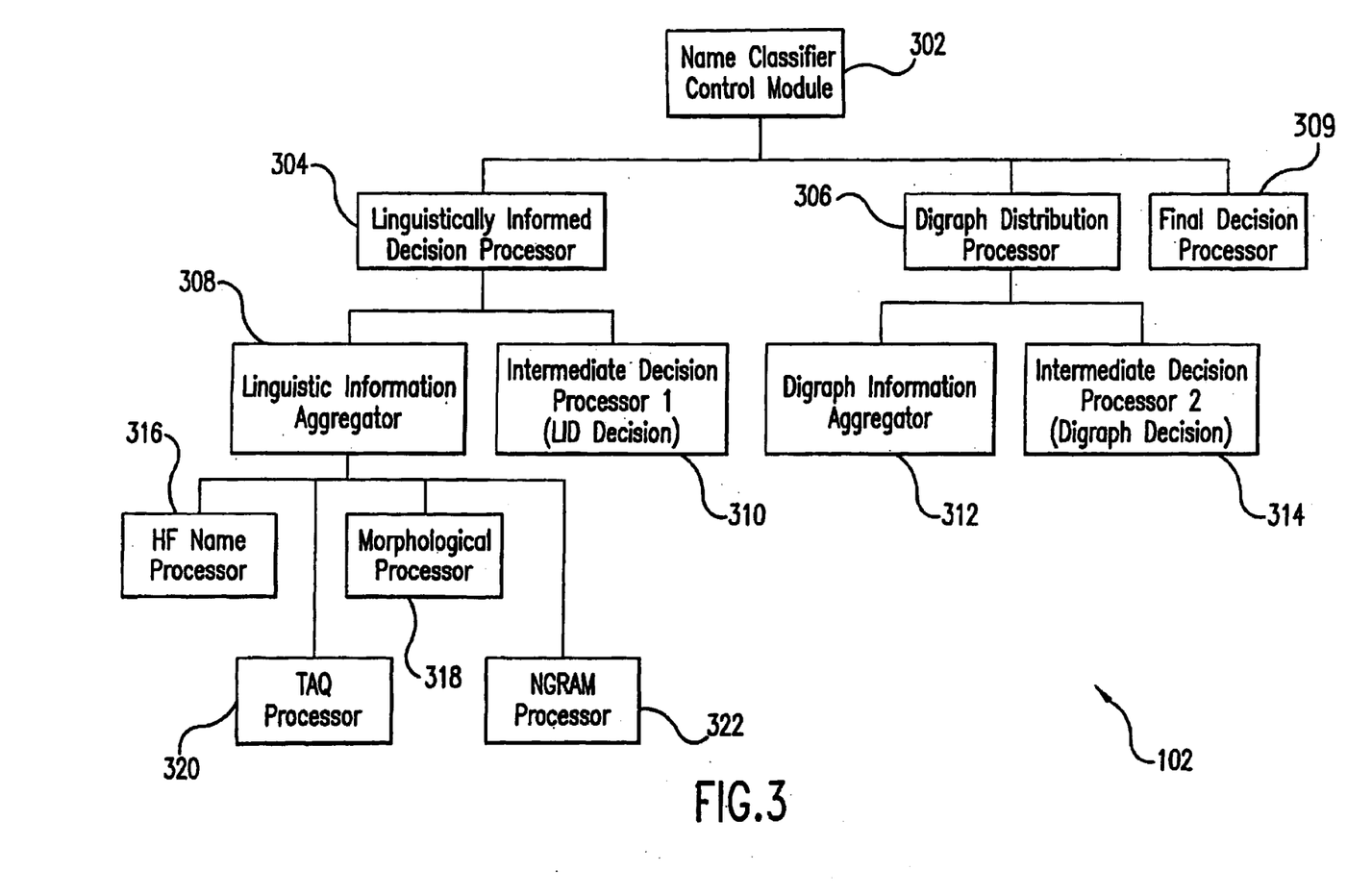
FIG. 3 is a block diagram showing the structure of a name ethnicity classifier according to the present invention.

FIG. 3 shows the software modules incorporated in name classifier module 102 in more detail. Name classifier module 102 incorporates a name classifier control module 302, a linguistically informed decision (LID) processor 304, a digraph distribution processor 306, and a final decision processor 309. Digraph distribution processor 306 incorporates digraph information processor 312 and digraph intermediate decision processor 314.

LID processor 304 incorporates linguistic information aggregator 308 and LID intermediate decision processor 310. LID aggregator 308 includes high frequency name processor 316, morphological processor 318, title/affix/qualifier (TAQ) processor 320, and ngram processor 322.

LID processor 304 accumulates and weighs factors from multiple knowledge sources to determine whether there is sufficient evidence to identify the input name as belonging to a particular ethnicity, e.g. Hispanic, Arabic, etc. Linguistic information aggregator 308 performs linguistic analysis, gathering information and scoring for the input name. In the preferred embodiment, linguistic information aggregator 308 generates scores from four data sources. High frequency name processor 316 accesses a high frequency name data store of names that occur frequently in particular cultures. A match with one of these names causes aggregator 308 to retrieve and record the culture associated with the name and a confidence score associated with that name. TAQ processor 320 breaks the name into particles and makes use of the information contained in those particles to match a list of titles, affixes, and qualifiers commonly used in names of various cultures, to help determine cultural affinity. The input name is segmented based on spaces in the name, and for each segment present in the input name, TAQ processor 320 determines whether that segment is a particle present in a TAQ data store. If so, TAQ processor 320 retrieves and records the culture, name field, and confidence score associated with that TAQ particle.

Morphological processor 318 processes morphological elements such as "-ovich" which suggest a particular cultural affinity. Morphological processor 318 determines whether morphemes in a morpheme data store are present in the input name by searching for matching substrings of the name segments in the input name. For each morpheme found in the input name, morphological processor 318 records the morpheme found, the culture, name field, and confidence level associated with that morpheme.

N-gram processor 322 searches the input name for strings of letters that occur with statistical significance in names with a given cultural affinity. For each n-gram present in an associated n-gram data store, n-gram processor 322 determines whether that n-gram is present in the input name. When a match is found, the processor records the n-gram found, the culture, name field, and score associated with that n-gram.

To avoid conflict between treatment of name segments and particles by the various processing modules operating on the input name, an order of precedence is established for processing. The order of precedence is preferably TAQ particle, morpheme, and then n-gram. That is, if a string of letters is identified as aTAQ particle, that string or any substring cannot also be identified as a morpheme or n-gram for that culture. If a string is identified as a morpheme, that string and its substrings cannot be considered as part of an n-gram for that culture. Locating the name among the high frequency names for a culture does not preclude morpheme or n-grams processing of the high frequency name, but if the confidence level in the high frequency match is high, further processing may not be necessary.

Figure 4:
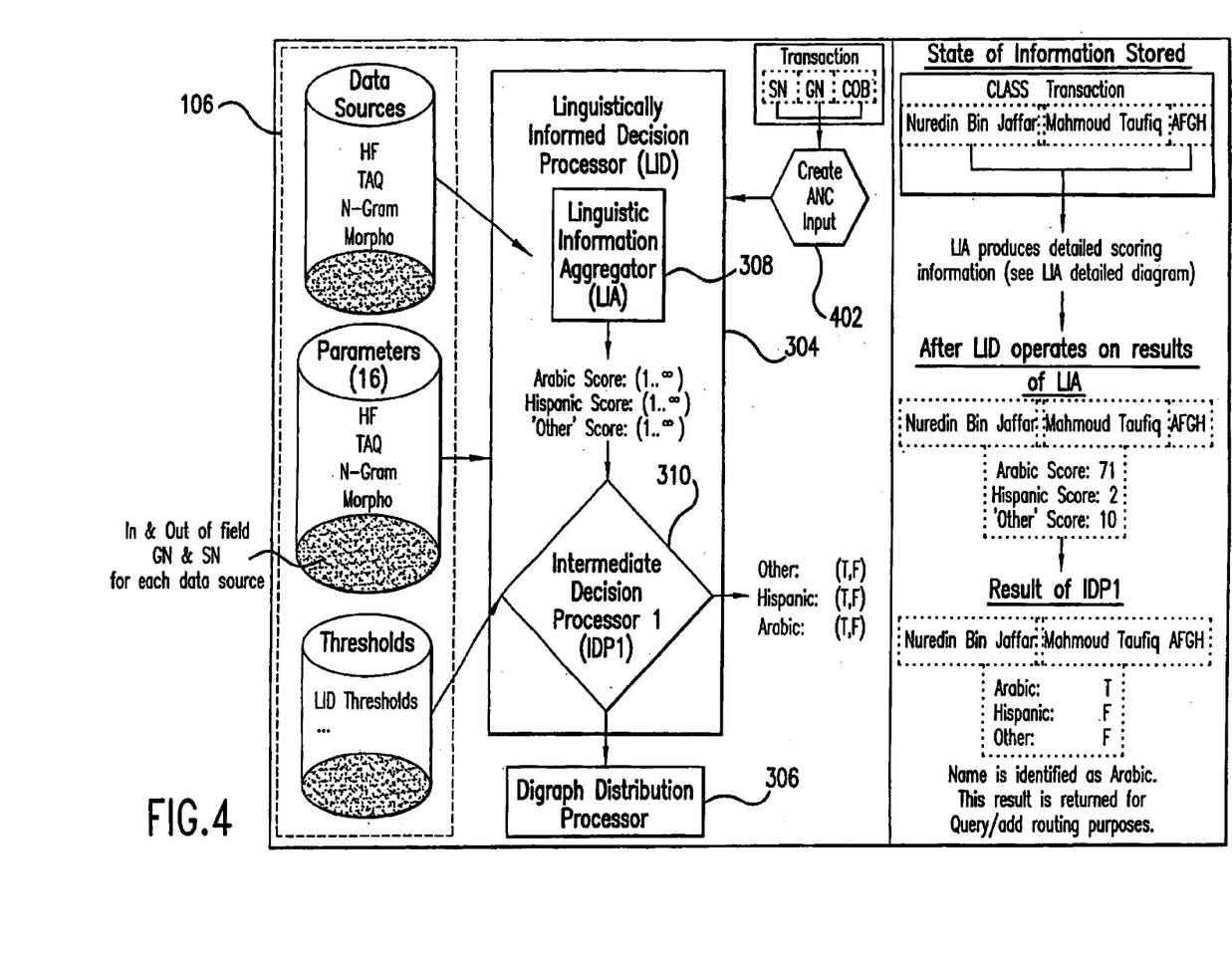
FIG. 4 is a schematic diagram showing the structure and operation of a preferred embodiment of a linguistically informed decision processor used in the classifier of FIG. 3.
Figure 5:
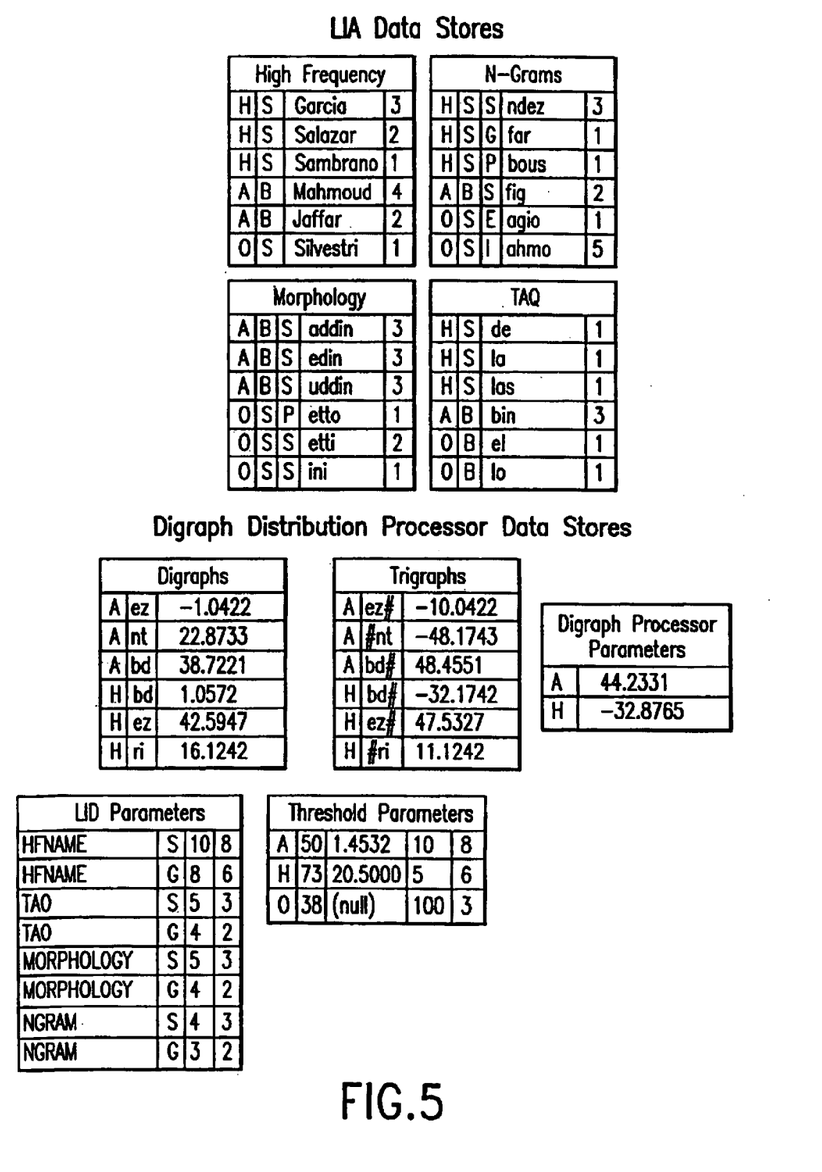
FIG. 5 shows a sample structure for data tables used in the linguistically informed decision processor of FIG. 4.

FIG. 4 is a schematic diagram showing the structure and operation of linguistically informed decision processor 304 in more detail. Linguistic information aggregator 308 collects necessary information from the input name 402 and name reference library 106, which includes the tables and other data used by linguistic information aggregator 308 (including high frequency name processor 316, morphological processor 318, title/affix/qualifier (TAQ) processor 320, and ngram processor 322, all shown in FIG. 3). A sample structure for these tables is shown in FIG. 5.

As shown in FIG. 4, processed information from linguistic information aggregator 308 passes to LID intermediate decision processor 310, where it is processed and the results passed to digraph distribution processor 306 or to final decision processor 309 (shown in FIG. 3).

LID intermediate decision processor 310 makes a preliminary decision about the cultural affinity of the name, based on the scoring information gathered by linguistic information aggregator 308. Processor 310 determines whether enough linguistic information has been gathered by LIA 308 to confidently determine that the input name belongs to one of the cultures identified by the system. Processor 310 accepts as input one aggregate LID score for each culture, as well as an aggregate LID score for "other." For each score, processor 310 compares the score to a LID threshold for the appropriate culture. If the LID score for a culture exceeds the threshold for that culture, processor 310 returns a value of "true" for the indicated culture. A "true" value for a culture indicates that enough evidence has been gathered to confidently identify the name as belonging to that culture. A "false" value for a culture indicates that not enough evidence has been accumulated to suggest that the name belongs to that culture. Alternatively, processor 310 may return a value for each culture equal to the LID score minus the LID threshold for that culture; in this case, negative values correspond to "false" and positive values correspond to a "true" indication.

Names which are strongly associated with one culture based on the output of LID intermediate decision processor 310 will not be processed further to identify their cultural origin, i.e. digraph and other analysis will be skipped.

Assuming the name has not been definitely identified, the surname portion is processed by digraph distribution processor 306. Based on a statistical model derived from digraph distribution statistics for names within various cultures, processor 306 computes a likelihood that the input name has a particular cultural origin. The information gathered from LID and digraph processing is combined, along with any other available information on the person (such as country of birth), in final decision processor 309. The available factors are weighted according to their confidence level to maximize the likelihood of an accurate ethnic origin evaluation. The result is an output indicating the likely classification of the name.

Following name typing, the system executes name variant generation module 104, which pre-processes the names according to culture-specific rules to generate query regularizations, based on algorithms adapted specifically for the cultural origin of the name in question, as determined by the name classifier. Variant generation module 104 also generates query expansions, i.e., identifies expected variants of the name to enhance matching capability.

Figure 6:
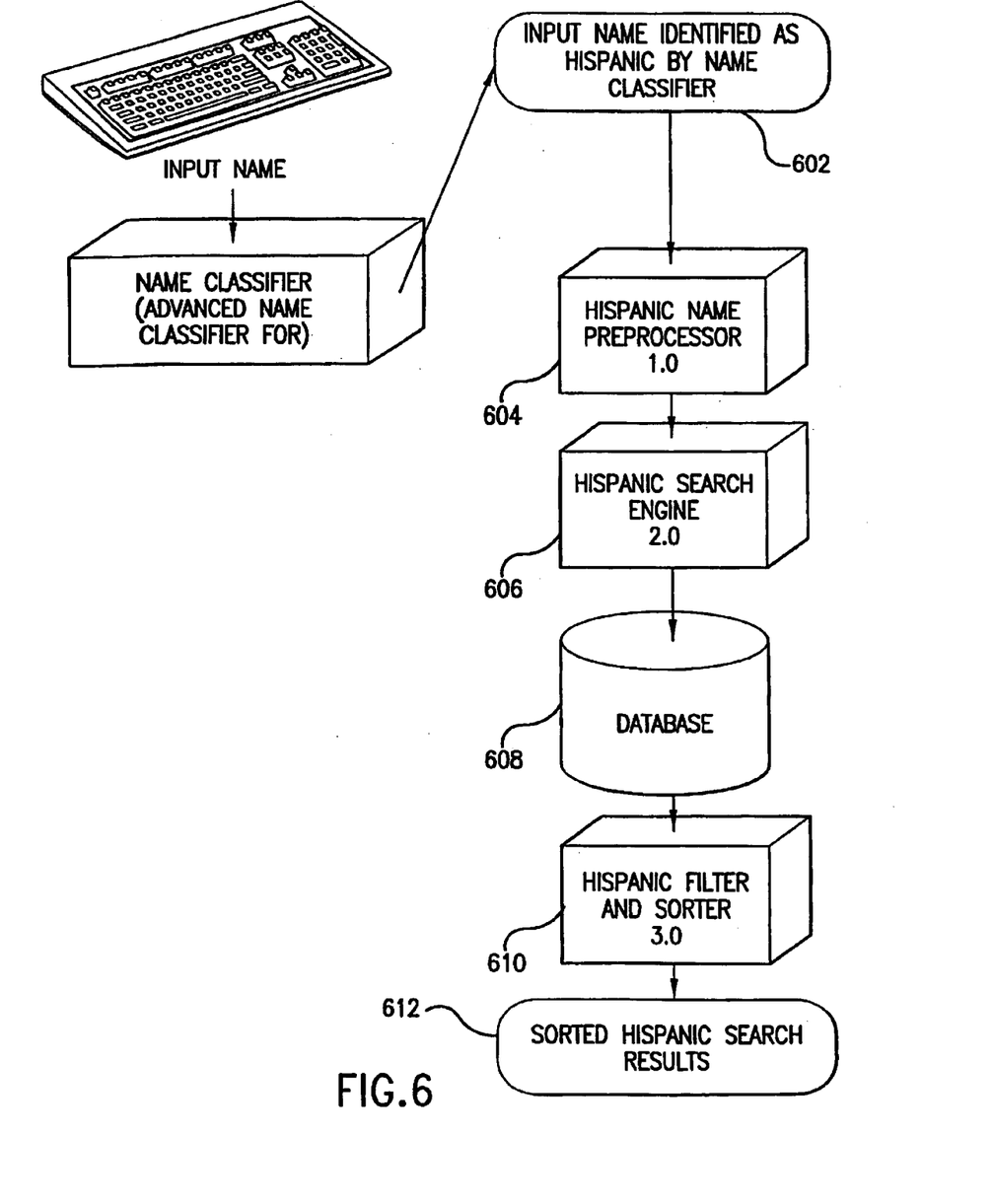
FIG. 6 is a flowchart showing a preferred embodiment of an Hispanic name searching process used in the invention.

As noted above, preferably, specialized processing is provided for each of a variety of ethnic name origins. Appendices B and C, which form a part of this specification, are software design descriptions for preprocessing and search algorithms for Arabic and Hispanic type names, respectively. As an example of such processing, the Hispanic processing algorithm referenced in Appendix C will now be discussed in some detail. FIG. 6 is a flowchart showing a preferred embodiment of Hispanic name processing used in the present invention. The process begins in name classification in block 602 when the input name is identified as an Hispanic name. The name is then fed to Hispanic name preprocessor in block 604, and to the Hispanic search engine in block 606, which searches database 608. Then, an Hispanic sorter and filter are applied in block 610. The process produces sorted Hispanic search results as an output in block 612.

Figure 7:
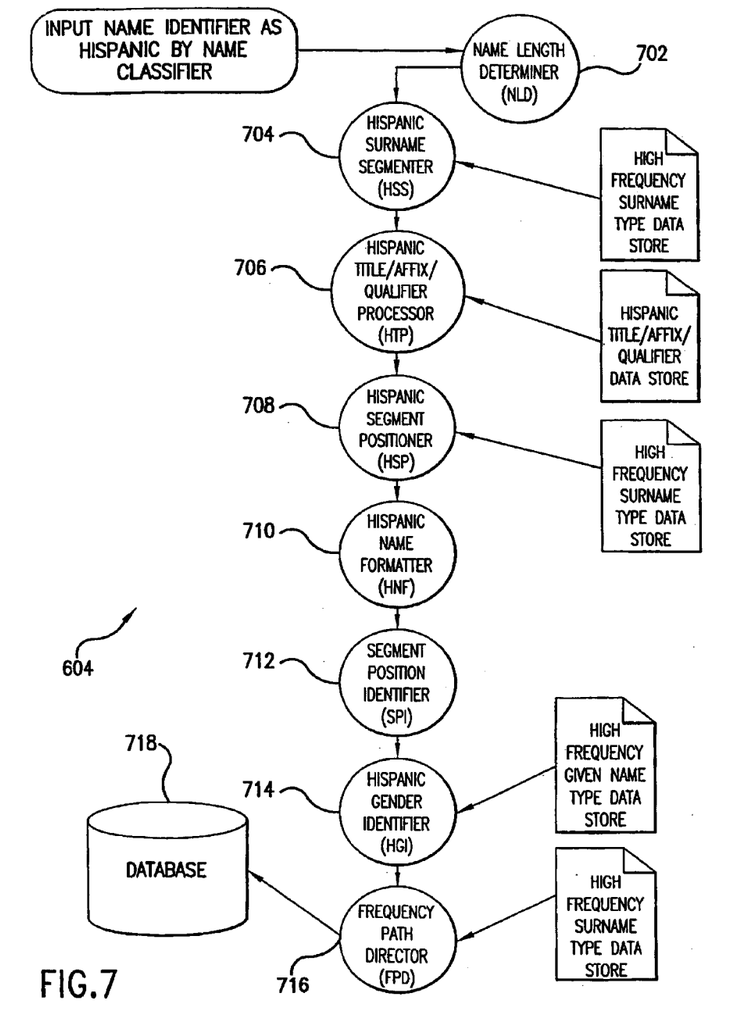
FIG. 7 is a flowchart showing preferred operation of an Hispanic name preprocessor in the process of FIG. 6.

FIG. 7 is an expanded flowchart showing an operational process of the Hispanic name preprocessor, referenced in Block 604 of FIG. 6. The Hispanic name processor prepares a name which has been identified as Hispanic for processing by the Hispanic search engine by identifying name segments and determining their disposition, manipulating the name segments to generate additional query formats, determining name length and record gender, specifying the frequency character of each name segment, and generating search keys.

The process begins with a name length determiner operation on Block 702, which determines the length of the surname. Next, the name is processed by a Hispanic surname segmenter in block 704. This operation divides surnames exceeding a predetermined length (e.g. nine characters) into component segments to compensate for the fact that fixed size data fields often do not accommodate an entire Hispanic surname, leading data entry operators to conjoin name segments in a single field. Then, additional query records are generated for the separated segments and alias records are added for the separated surname segments. This process accesses a high frequency surname type data store to identify surname portions that should be separated. For example, this operation would separate "RAMIREZDELAPAZ" in the surname field into RAMIREZ DELA PAZ and "PEREZDELOPEZ" into PEREZ DE LOPEZ by finding the known surname components DE and DELA.

An Hispanic TAQ processor operates in Block 706 to scan the given name and surname for known titles, affixes, and qualifiers which do not have useful search value. TAQ elements such as DEL, DELA, DE, and SAN are then flagged to be either deleted, disregarded during matching operations, or removed. Delete means that the segment is disregarded for the remainder of the name search process and contributes marginal information to the filter process, but is not actually removed from the record. Disregard means the segment is disregarded in the remainder of the name search process but contributes to evaluation in the filter process. Remove means that a segment conjoined to the name stem is removed from the stem, and then flagged to be either deleted or disregarded as appropriate.

The Hispanic segment positioner in Block 708 operates to move any high frequency surname found in the given name field into the surname field. The name is then formatted by an Hispanic name formatter in Block 710 to generate additional name formats in case the record has more than two surname stems. Next, the name is processed by a segment position identifier in Block 712 to identify the relative position of each of the surname and given name stems. Hispanic names generally contain more than one stem in the given name and surname. In a given name, the leftmost name stem generally indicates gender; in a surname, the leftmost stem is the family name and the other stems are differentiators. Therefore, it is important to identify names that are out of position so that this may be corrected and their relevance appropriately evaluated during the search.

Next, the likely gender of the name is identified by a Hispanic gender identifier in Block 714. The gender identifier attempts to predict gender based on the gender marker of the leftmost given name segment, but may also rely on (or override the apparent gender) based on additional information such as a gender indicated as associated with the search name.

The name is processed by a frequency path director in Block 716 which directs a record for high frequency processing or low frequency processing depending on the presence or absence of high frequency surnames in the input name string.

Figure 8:
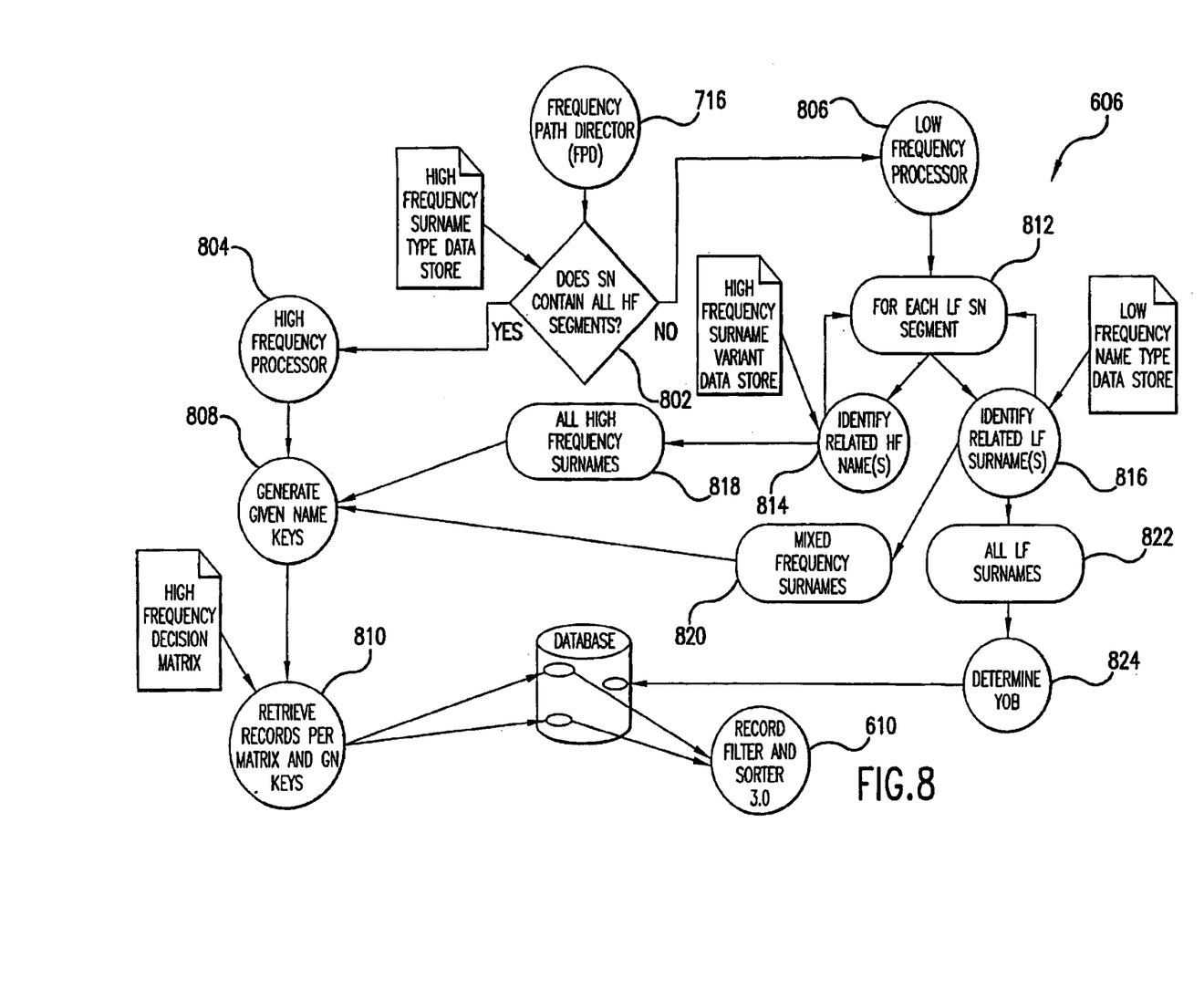
FIG. 8 is a flowchart showing preferred operation of an Hispanic search engine in the process of FIG. 6.
Figure 11:
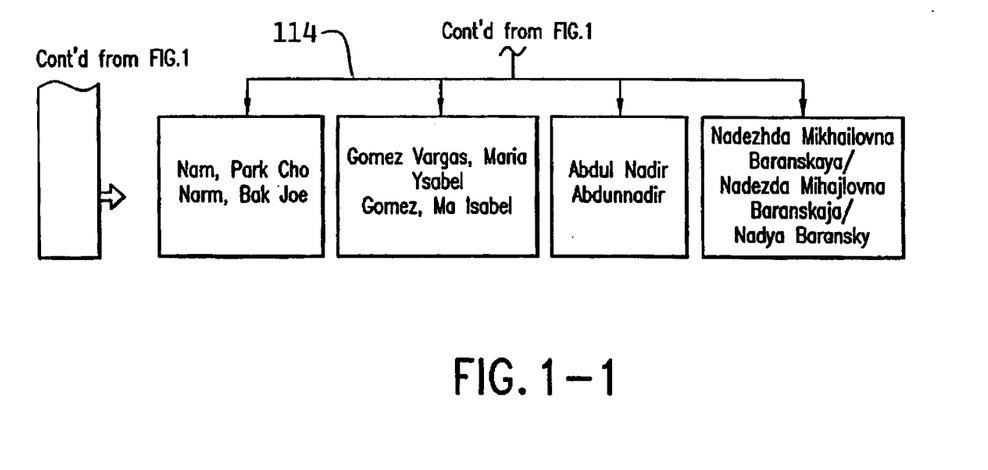

In FIG. 8, the flow of operation of the Hispanic search engine 606 is shown in more detail. As described above, the frequency path director operates in block 716 and then determines in block 802 whether the surname contains all high frequency segments. If so, control passes to the high frequency processor in block 804. If not, control passes to the low frequency processor in block 806.

The high frequency processor operation begins in Block 808 with generation of keys for the given names. Then, in block 810, records are retrieved according to a high frequency surname matrix and the given name keys. Control then passes to filter and sorter 610 (shown in FIG. 6).

Low frequency processor operation begins in Block 812 where each low frequency surname segment is examined to identify related high frequency and low frequency surnames, in blocks 814 and 816. This processing loop continues until names related to the segments have been identified. A "relationship" to a high frequency surname is determined by digraph comparison. If the number of identical digraphs exceeds a specified threshold, the surname is deemed to be a mere spelling variant of the similar high frequency surname. If the surnames all relate to known high frequency names, control passes through block 818 to block 808 in the high frequency processor. If the surnames have mixed high and low frequency relationships, control passes through block 820 to block 808. If all surnames have low frequency, control passes through block 822 to block 824. In block 824, a year of birth range is determined for the name. Records are then retrieved based on name content (same or different), position of the name segments, the year of birth range, the record gender, and possibly additional restrictions based on the given name.

Referring again to FIG. 1, the typing and processing of names within the system is preferably informed by cultural information encoded in a name reference library 106. The factors included in name reference library 106 are identified in the database structures shown in Appendix D, which forms a part of this specification. Appendix E, which also forms a part of this specification, provides additional flowcharts and software descriptions for a preferred embodiment of name classifier module 102 and the Hispanic name search algorithms.

Significantly, as part of name regularization for the purpose of generating an index key for a first pass through the database, the present invention applies the International Phonetic Alphabet to generate index keys, rather than using a Soundex or another conventional key. The IPA algorithm, according to the present invention, generates keys by segmenting (e.g. syllabifying) the name in question and converting it to IPA representation. In this manner, the system generates a key or set of keys which identify a set of pronounced equivalents, rather than generating a key by letter similarity, as in the traditional Soundex method. Significantly, the system generates multiple keys in IPA representation for most names, since most names have multiple possible pronunciations. The system determines multiple possible pronunciations of the name, where applicable, and associates an IPA key with each possible pronunciation. Then, records matching any of the IPA keys for a name are then selected for further consideration and comparison.

To program the IPA conversion, a rule set is generated that relates spelling to sounds. A different rule set is preferably generated for each ethnic origin of name, since pronunciations of apparently similar names may vary significantly based on origin. To generate a rule set, preferably a database of single name elements is obtained, such as a census list. The names in the list may are then manually tagged for their ethnic origin A variety of sources may then be used to determine possible pronunciations. These sources include native speaker knowledge and textual information. The rules are written broadly so that the most plausible pronunciations will be captured with some certainty. Rules for languages not written in roman characters will necessarily take into account transcription variations. The rules are written in a predetermined notation which can be processed effectively by the system. A typical rule format is:

sc/anything_le→[sk?]

which is interpreted to mean that the letters sc preceded by anything and followed by the letters le can be pronounced as [s] or [sk], e.g. Muscle and Mosclin. The rules should also be written to account for predictable articulatory processes such as movement of the soft palate, which might lead to a slightly different pronunciation.

As an example of the advantages of matching on IPA, consider a query on the name Lee. Converted to the IPA string [li], exact matches with numerous spelling variants are automatic, including Leigh and Li. Typical prior-art character based matches will fail to retrieve Leigh or Li, since the percentage of character overlap is minimal. Conversely, a standard index matching system such as Soundex will categorize Lee and Li identically, but will still miss Leigh, given the presence of a salient letter (g), and will retrieve a large number of names of low relevance, including Lu, Liao, Low, Louie, Lahoya, and Lehew. The IPA anaylsis process is further described in Appendix F, which forms a part of this specification.

While the IPA key generation, according to the present invention, provides a significant functional advantage in many cases, it should be noted that it may not be desirable to apply IPA processing to all classes of names. For example, the inventors have found that names of Arabic and Chinese origin are better processed using custom regularization algorithms rather than by the generalized IPA approach, since names acknowledged as similar in these cultures are often quite distinct phonologically.

Following regularization and expansion, name retrieval technology processing module 108 is applied. These algorithms facilitate more complete retrieval, by compensating for transpositions; deleting affixes, where appropriate; and compensating for inverted surnames, deleted surnames and nicknames. Each of these algorithms uses stored information defining naming conventions for a particular culture in the manner described herein.

Next, retrieval module 110 is applied to the results of the preprocessing performed by name classifier 102, variant generation module 104, and retrieval technology module 108. Retrieval module 110 retrieves records matching the keys (IPA or other culture-specific keys) generated by the operation of the first three modules. These records are then provided to precision filter and sorting module 112, which compares each record to the query name to determine a similarity/equivalence measurement defining the "distance" between the query name and the record name. Precision filter and sorting module 112 may perform segment position comparisons, character comparisons, phonological similarity comparisons, structural similarity comparisons, phonofeature-distance comparisons, and/or n-gram comparisons.

The output 114 of precision filter and sorting module 112 is then provided to the user. The output preferably consists of a rank-ordered list of records in descending order of likelihood of matching the query name.

One preferred embodiment implementing many desirable features of the system shown in FIG. 1 is a standalone database search and retrieval program. In addition to including the features described above (and in further detail in the Appendices), this embodiment of the invention may preferably be implemented according to the disclosure in Appendices G, H, I, and J, which form a part of this specification and are: a narrative description, technical plan, acceptance test, and source code listing respectively for a system demonstrating numerous features of the present invention.

Figure 2:
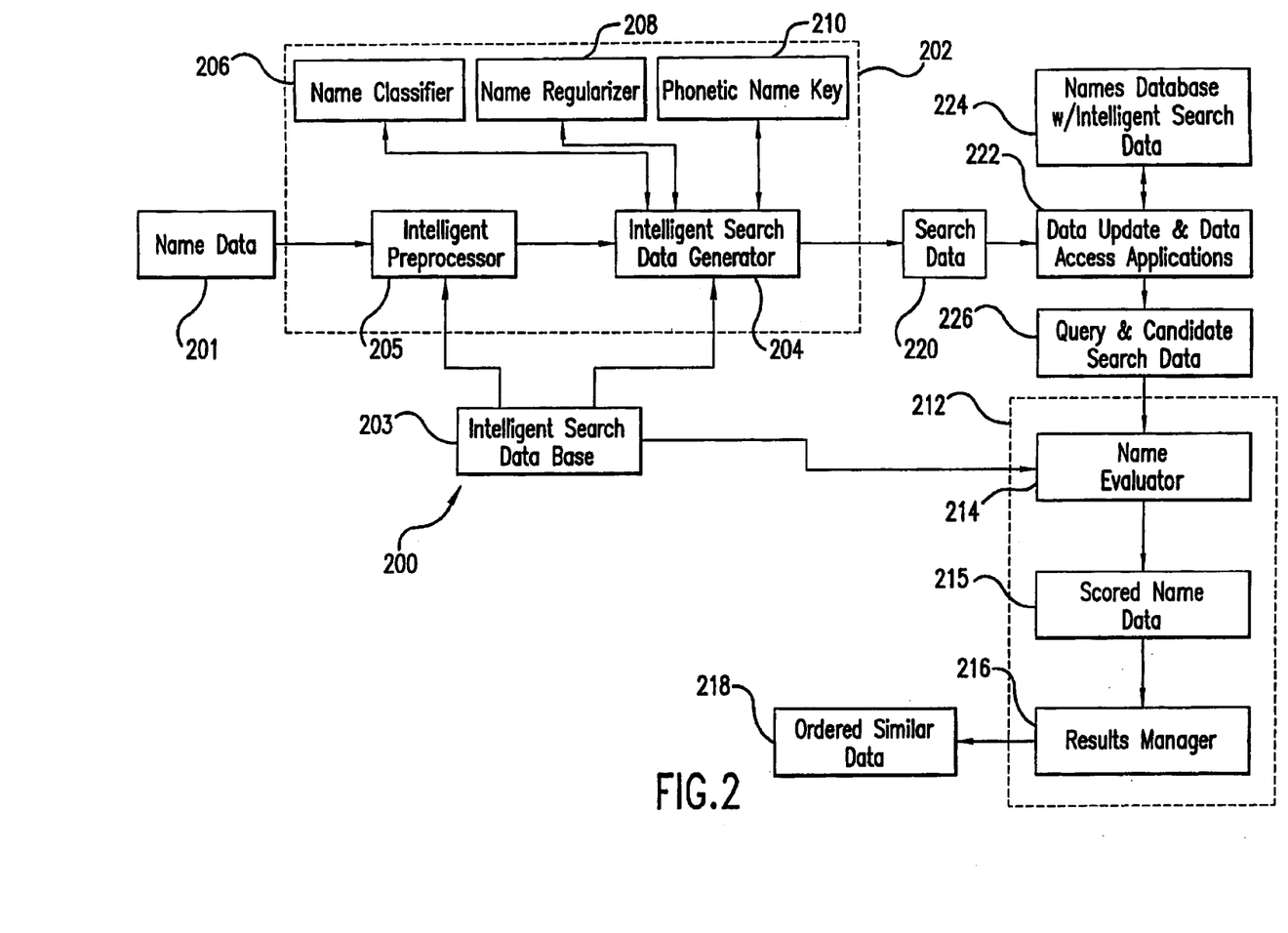
FIG. 2 is a block diagram of the structure of a set of name searching tools which may be provided as one or more Application Programming Interfaces (APIs) for use in developing custom applications.

Another desirable implementation of the invention is as a set of name searching tools which may be provided as one or more Application Programming Interfaces (APIs) for use in developing custom database management and searching applications. A flowchart for one embodiment of an API embodiment is shown in FIG. 2. Further detail of the implementation of this embodiment is provided in Appendices K (software design description), L (default parameters), M (developer's documentation) and N (source code listing), each of which forms a part of this specification. Operation of elements in the embodiment of FIG. 2 are generally similar to like operational features described with reference to FIG. 1.

As shown in FIG. 2, a preferred embodiment of an API-based name searching system 200 comprises name extraction tools 202 and name comparison tools 212. Name extraction tools 202 comprise Intelligent Search Data Generator (ISDG) 204 and associated intelligent search database 203, intelligent pre-processor 205, name classifier 206, name regularizer 208, and phonetic key generator 210. Name comparison tools 212 comprise name evaluator 214 and results manager 216, with scored name data 215 as an intermediate step. The system receives as an input name data 201, and provides ordered similar data 218 as an output from name comparison tools 212.

The output of ISDG 204 is search data 220, which is provided to data update and data access applications 222 and from there to the name comparison tools 212 as query and candidate search data 226. A names database with intelligent search data 224 is provided in association with data update and data access applications 222.

The embodiment of FIG. 2, like that described previously with reference to FIG. 1, implements a multifaceted approach to multicultural name searching. For example, in the Hispanic culture, an individual typically has a compound family name (e.g.,-Arantxa SANCHEZ VICARIO), the first of which (SANCHEZ) provides the more valuable identifying information. In contrast, although Portuguese names also typically have compound family names and look very similar to Hispanic names (e.g., Maria FERREIRA DOS SANTOS), the second family name (DOS SANTOS) provides the more valuable identifying information. If a single solution were proposed where, for example, the Last Name is considered the most important name, as in American names, Hispanic names would not be adequately accommodated.

The disclosed embodiment automatically applies whatever resources will adequately address the problem at hand, whether the variation is cross-cultural or arises from spelling variation, from transcription from other writing systems, from sound similarity, or from missing or additional information.

In operation, the user system supplies both a query name and a database name to the system. The system employs linguistic intelligence to separate the name into its integral components in intelligent pre-processor 205. Further linguistic intelligence is employed to compare the two names in name evaluator 214. The result of the comparison is a scored database name, scored name data 215. The scored name is passed to results manager 216, which collects and orders the names that are scored against a single query name. The final output is an ordered set of scored database names, ordered similar data 218.

The cornerstone of this embodiment is a programming library (functions and classes) that enables a developer to add fuzzy logic personal name searching to an application. For example, the developer may perform operations such as "Give me the 10 closest names to 'James Slesinger' from my database", or "Give me all the names from my database that match 'John Wong' with a degree of confidence of 0.9" or "Tell me the degree of similarity between 'Paul Vanesann' and 'P Vanlesann'". The system incorporates and uses a variety of linguistic techniques to achieve these results, in the manner described previously with respect to a standalone name searching system.

Users can enhance the functionality of the APIs by incorporating their business rules and data into the name comparison process. This embodiment provides fine granularity when comparing names. That is, names are scored and ranked more precisely, which is important when dealing with large volumes of data. The technology incorporates numerous parameters (to customize the user's search comparison).

From the user/developer perspective, the name search system is quite simple to utilize. A typical name search requires the use of just four classes (SNQueryParms, SNQueryNameData, SNEvalNameData, and SNResultsList). In addition, it is important to note that the extra code required to integrate this name search technology is minimal.

The API name search interface is simplified by the fact that it makes no assumptions about the data and how it is stored. The user provides the API with the query name as well as the names from the database as input 201. The library routine then presents names which are likely matches, and qualifies their degree of similarity. From the perspective of the developer, the tool is straightforward and easy to integrate.

Searches via the API embodiment are configurable by adjusting any of 43 parameters (see Appendix L for defaults). Each parameter controls some aspect of how two names are evaluated when determining if they are similar. Some of the more basic parameters set thresholds for determining how close two names must be to be considered a match. Other parameters control more complex processing, such as how to handle multi-segment names. In general, only a small set of parameters need to be adjusted by the developer, because reasonable defaults exist for each one.

The API embodiment also provides pre-defined packages of parameters, each tailored to a particular culture or ethnicity. For example, Hispanic names have certain characteristics such as compound surnames (e.g., TORRES DE LA CRUZ) that can cause problems when searching for Hispanic names using conventional, Anglocentric methods. The Hispanic parameters package contains settings that address Hispanic-specific name issues. New cultural/ethnic parameter packages can be established and existing packages can be modified as desired.

The preferred embodiment uses a C++ object framework, so that users/developers can extend the existing product functionality to incorporate additional data elements in the scoring algorithm or create evaluation methods specific to their business or application needs. For example, a database might contain a Social Security number, in addition to given name and surname. Although the name search technology only compares name data, a developer can take advantage of class inheritance (a feature of C++), and easily subclass the program's SNEvalNameData and SNQueryNameData objects to include Social Security numbers or any other desired data element(s). These data elements can then be used in the methods that score evaluation names and determine which evaluation names are matches. In other words, record matching can be performed using name data in conjunction with other available data element information.

Users/Developers can also provide custom methods for determining if an evaluation name matches a query name or not. The default method compares the average of the given name score and surname score to a user/developer supplied threshold value. However, a more complex method may be desired. For example, the business rules of an application might dictate that a name cannot be considered a match unless either the surname or given name is an exact match. By overriding the default method, the developer can easily implement this logic in just a few lines of code.

The functions provided in the API embodiment will now be described in more detail. The available functions include comparing a query name with one or more candidate names to produce an ordered list of candidate names with the highest probability of representing the same named person. This functionality is referenced as the name comparison tools 212. The basic name checking tool employs multiple evaluation techniques to evaluate and score two names. The name checking tool incorporates information regarding variations in spelling, discrepancy in the number of name segments (amount of information included), exclusion of expected information, and positional information to establish a name score, which indicates the probability that the two names represent the same individual. The tool is controlled by a set of configurable parameters. The tool also manages and produces an ordered or unordered list of candidate names with the highest probability of representing the same named person, based on the developer defined criteria for establishing a set of results. Various culture specific callable modules are available as extensions to the name check tool, including a name classifier that culturally classifies name data, a name regularizer that levels variations in name data to a single representation, and a phonetic name key that represents name data based on phonetic similarity. Again, each of these tools and modules incorporates the methods and technology described above with reference to FIGS. 1 and 3–8.

The program also generates and stores intelligent search data for use in extracting relevant subsets of data from large data bases for further evaluation. These mechanisms will facilitate more efficient name searching while ensuring complete and accurate results. This functionality is referenced as the Name Extraction Tool(s). The disclosed embodiment provides users/developers with the capability to compare two names to determine the probability that they both represent the same named individual or to compare a single query name with a set of candidate names to determine which candidate names are most likely to represent the same named individual.

When a set of candidate names is evaluated, the APIs enable the user/developer to define the criteria for producing their own ordered list of results. The criteria for defining an ordered list of results include the following: the top X candidate names (i.e., the X candidate names scoring the highest probability that they represent the same named individual; e.g., the top ten candidate names); all candidate names whose name score exceeds a pre-defined name threshold (e.g., if the threshold =0, all candidate names will be returned in an ordered list); or the top X candidate names whose name score exceeds a pre-defined name threshold.

Name comparison tools 212 include a name evaluator 214, which employs multiple evaluation techniques to evaluate and score two names. Name evaluator 214 incorporates information regarding variations in spelling, inclusion of additional information, exclusion of expected information, and positional information in order to establish a name score, which indicates the probability that the two names represent the same individual. Name evaluator 214 is controlled by a set of configurable parameters. Results manager 216 uses the intermediate scoring information provided by name evaluator 214 to manage and produce an ordered list of candidate names with the highest probability of representing the same named person, based on the developer-defined criteria for establishing the results.

Name extraction tools 202 include an Intelligent Search Data Generator (ISDG) 204 which generates one or more search data values that facilitate extraction of relevant information from a data base for further comparative analysis. This tool is an important component of any search system that must search large volumes of data to locate similar name data, to the extent that it is not feasible to retrieve and evaluate every name record in a data base to determine its relevance to a query name. ISDG 204 provides a motivated method for retrieving all relevant information from a data base while reducing the amount of non-relevant information retrieved. This tool can provide significant performance improvements while also ensuring an accurate and complete name search. Various culture-specific tools are available as extensions to ISDG 204 to address specific issues such as the cultural classification of name data, performed by name classifier 206; leveling of variations in name data to a single representation, performed by name regularizer 208; and the representation of name data based on phonetic similarity, performed by phonetic key generator 210.

Thus, there has been disclosed an improved system and method, in multiple embodiments, for searching personal name databases, with maximum simplicity and ease of integration, maximum flexibility, and maximum extensibility.

We claim:

1. A computer-implemented method of comparing input names and a stored names, the method comprising:
   accessing an input name of a particular human culture;
   accessing a stored name of the particular human culture;
   selecting a first linguisitic algorithm that is based on the stored name and other names in the particular human culture, wherein the first linguistic algorithm is based on one or more linguistic features including one or more of phonological features, orthographic features, semantic features, syntactic features, n-gram based features, the number of elements in names, the types of elements in names, variations in spelling of a name, accounting for exclusion of expected information in a name, positional information of names, inclusion of additional information in a name, and whether surnames match;
   selecting a second linguistic algorithm, different from the first linguistic algorithm, that is based on the stored name and other names in the particular human culture, wherein the second linguistic algorithm is based on one or more linguistic features including one or more of phonological features, orthographic features, semantic features, syntactic features, n-gram based features, the number of elements in names, the types of elements in names, variations in spelling of a name, accounting for exclusion of expected information in a name, positional information of names, inclusion of additional information in a name, and whether surnames match, wherein the first linguistic algorithm and the second linguistic algorithm are based on different linguistic features of the particular human culture;
   comparing the input name and the stored name using the first linguistic algorithm;
   comparing the input name and the stored name using the second linguistic algorithm; and
   providing a non-binary indication of whether the input name matches the stored name base on (i) the comparing of the input name and the stored name using the first linguistic algorithm and (ii) the comparing of the input name and the stored name using the second linguistic algorithm.

2. The method of claim 1 wherein selecting the first linguistic algorithm comprises:
   selecting a set of algorithms based on names in the particular culture, the set of algorithms being selected from among multiple sets of algorithms, each set of algorithms being based on names in a different culture; and
   selecting the first linguistic algorithm from the set of algorithms.

3. The method of claim 1 wherein selecting the first linguistic algorithm comprises selecting the first linguistic algorithm from among multiple algorithms, each algorithm being based on names in a different culture.

4. The method of claim 1 wherein providing the indication comprises providing an indication that the input name matches the stored name.

5. The method of claim 1 further comprising:
   accessing a second stored name of the particular culture;
   comparing the input name and the second stored name using the first linguistic algorithm; and
   providing an indication of whether the input name matches the second stored name based on the comparing of the input name and the second stored name.

6. The method of claim 5 wherein:
   providing the indication of whether the input name matches the stored name comprises providing an indication that the input name matches the stored name, and
   providing the indication of whether the input name matches the second stored name comprises providing an indication that the input name matches the second stored name.

7. The method of claim 5 wherein:
   comparing the input name and the stored name comprises producing a score indicating likelihood of the input name matching the stored name, and
   comparing the input name and the second stored name comprises producing a second score indicating likelihood of the input name matching the second stored name.

8. The method of claim 7 further comprising ranking the stored name and the second stored name based on the score and the second score.

9. The method of claim 1 wherein comparing the input name and the stored name comprises segmenting the input name into different types of elements, the segmenting being based on the particular culture.

10. The method of claim 9 wherein segmenting the input name is based on a space in the input name.

11. The method of claim 9 wherein segmenting the input name contributes to a determination of where a space should appear in the input name.

12. The method of claim 9 wherein comparing the input name and the stored name further comprises assigning a weight to an element of the input name based on the particular culture and based on a type of the element, the weight indicating a relative amount of identifying information expected to be contained in the element.

13. The method of claim 12 wherein assigning the weight comprises assigning a relatively low weight to the element.

14. The method of claim 13 wherein the element comprises a title.

15. The method of claim 13 wherein the element comprises an affix.

16. The method of claim 13 wherein the element comprises a qualifier.

17. The method of claim 1 wherein the first linguistic algorithm is based on a naming convention in the particular culture, and comparing comprises comparing using the first linguistic algorithm that is based on the naming convention.

18. The method of claim 17 wherein the naming convention includes information on which name element has the most valuable identifying information.

19. The method of claim 18 wherein the naming convention identifies the last of multiple surnames as having the most valuable identifying information.

20. The method of claim 1 wherein comparing comprises producing a score indicating likelihood of the input name matching the stored name.

21. The method of claim 20 wherein providing the indication comprises providing the score.

22. The method of claim 21 wherein providing the score comprises providing the score to a user.

23. The method of claim 20 wherein the score is non-binary.

24. The method of claim 20 wherein the score indicates a partial match between the input name and the stored name.

25. The method of claim 2 wherein comparing the input name and the stored name using the first linguistic algorithm comprises comparing phonological similarity of the input name and the stored name.

26. The method of claim 1 wherein comparing the input name and the stored name using the first linguistic algorithm comprises comparing orthographic similarity of the input name and the stored name.

27. The method of claim 26 wherein comparing the input name and the stored name using the first linguistic algorithm comprises performing an n-gram analysis of the input name and the stored name.

28. The method of claim 27 wherein performing the n-gram analysis comprises performing a digram analysis.

29. The method of claim 27 wherein performing the n-gram analysis considers position of n-grams within the input name and the stored name.

30. The method of claim 1 wherein comparing the input name and the stored name using the first linguistic algorithm comprises comparing syntax of elements of the input name and elements of the stored name.

31. The method of claim 1 wherein comparing the input name and the stored name using the first linguistic algorithm comprises comparing semantic equivalence of the input name and the stored name.

32. The method of claim 1 wherein comparing the input name and the stored name using the first linguistic algorithm comprises comparing discrepancy in number of elements of the input name and the stored name.

33. The method of claim 1 wherein comparing the input name and the stored name using the first linguistic algorithm comprises accounting for variations in spelling of the input name of the stored name.

34. The method of claim 1 wherein comparing the input name and the stored name using the first linguistic algorithm comprises accounting for exclusion of expected information in the input name or the stored name.

35. The method of claim 1 wherein comparing the input name and the stored name using the first linguistic algorithm comprises comparing positional information of the input name and the stored name.

36. The method of claim 1 wherein comparing the input name and the stored name using the first linguistic algorithm comprises accounting for inclusion of additional information in the input name or the stored name.

37. The method of claim 1 wherein:
comparing the input name and the stored name comprises determining whether surnames of the input name and the stored name match, and
providing the indication comprises providing an indication that the input name does not match the stored name if surnames of the input name and the stored name do not match.

38. The method of claim 1 wherein:
the input name is a predictable variation of the stored name, and
providing the indication comprising providing an indication that the input name matches the stored name.

39. The method of claim 1 wherein:
the input name is a random variation of the stored name, and
providing the indication comprising providing an indication that the input name matches the stored name.

40. The method of claim 1 wherein:
the input name includes a first element randomly varied from the stored name and a second element predictably varied from the stored name, and
providing the indication comprising providing an indication that the input name matches the stored name.

41. The method of claim 1 wherein comparing the input name and the stored name is based on a user-configurable parameter.

42. The method of claim 1 wherein accessing the stored name comprises accessing a name that is stored in volatile memory.

43. An apparatus comprising a computer readable medium having instructions stored thereon that when executed by a machine result in at least the following:
accessing an input name of a particular human culture;
accessing a stored name of the particular human culture;
selecting a first linguistic algorithm that is based on the stored name and other names in the particular human culture, wherein the first linguistic algorithm is based on one or more linguistic features including one or more of phonological features, orthographic features, semantic features, syntactic features, n-gram based features, the number of elements in names, the types of elements in names, variations in spelling of a name, accounting for exclusion of expected information in a name, positional information of names, inclusion of additional information in a name, and whether surnames match;
selecting a second linguistic algorithm, different from the first linguistic algorithm, that is based on the stored name and other names in the particular human culture, wherein the second linguistic algorithm is based on one or more linguistic features including one or more of phonological features, orthographic features, semantic features, syntactic features, n-gram based features, the number of elements in names, the types of elements in names, variations in spelling of a name, accounting for exclusion of expected information in a name, positional information of names, inclusion of additional information in a name, and whether surnames match, wherein the first linguistic algorithm and the second linguistic algorithm are based on different linguistic features of the particular human culture;
comparing the input name and the stored name using the first linguistic algorithm;
comparing the input name and the stored name using the second linguistic algorithm; and
providing a non-binary indication of whether the input name matches the stored name based on (i) the comparing of the input name and the stored name using the first linguistic algorithm and (ii) the comparing of the input name and the stored name using the second linguistic algorithm.

* * * * *